(12) United States Patent
Miyake

(10) Patent No.: US 9,050,861 B2
(45) Date of Patent: Jun. 9, 2015

(54) PNEUMATIC TIRE WITH TREAD HAVING NARROW GROOVE

(75) Inventor: Akinori Miyake, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 0 days.

(21) Appl. No.: 13/287,692

(22) Filed: Nov. 2, 2011

(65) Prior Publication Data

US 2012/0118459 A1 May 17, 2012

(30) Foreign Application Priority Data

Nov. 12, 2010 (JP) ................................ 2010-253681

(51) Int. Cl.
 *B60C 11/00* (2006.01)
 *B60C 11/01* (2006.01)
 *B60C 11/04* (2006.01)
 *B60C 11/13* (2006.01)

(52) U.S. Cl.
 CPC ......... *B60C 11/13* (2013.01); *B60C 2011/0348* (2013.04); *B60C 2011/133* (2013.04)

(58) Field of Classification Search
 CPC .................. B60C 2011/0348; B60C 2011/036; B60C 11/032; B60C 11/13; B60C 2011/133
 USPC ............. 152/209.17, 209.18, 209.21, 209.27, 152/DIG. 3
 IPC .............................................. B60C 11/04, 11/13
 See application file for complete search history.

(56) References Cited

U.S. PATENT DOCUMENTS 5,526,860 A * 6/1996 Minami .................... 152/209.18

FOREIGN PATENT DOCUMENTS

| JP | 59076403 U | * | 5/1984 | ............. B60C 11/00 |
|---|---|---|---|---|
| JP | 60036304 U | * | 3/1985 | ............. B60C 11/06 |
| JP | 07076204 A | * | 3/1995 | ............. B60C 11/04 |
| JP | 9-002018 A | | 1/1997 | |
| JP | 11301214 A | * | 11/1999 | ............. B60C 11/04 |
| JP | EP1048488 A | * | 11/2000 | ............. B60C 11/11 |
| JP | 2005001593 A | * | 1/2005 | |
| JP | 2005343381 A | * | 12/2005 | ............. B60C 11/01 |
| JP | 2006-143134 A | | 6/2006 | |
| JP | 2008-279865 A | | 11/2008 | |
| JP | 2009090949 A | * | 4/2009 | |

OTHER PUBLICATIONS

Partial Translation for JP2005-343381; Kobayashi, Hironori; (No date).*
Machine Translation for JP2005-343381; Kobayashi, Hironori; (No date).*

(Continued)

*Primary Examiner* — Steven D Maki
*Assistant Examiner* — Kendra Ly
(74) *Attorney, Agent, or Firm* — Westerman, Hattori, Daniels & Adrian, LLP

(57) ABSTRACT

A pneumatic tire comprises a shoulder land portion extending a tire circumferential direction on a tread surface, and a narrow groove extending in the tire circumferential direction on the shoulder land portion, wherein dimples are arranged in a staggered manner with respect to the tire circumferential direction while overlapping with each other as seen in a depth direction of the narrow groove, on a groove wall in an inner side in a tire width direction of the narrow groove, and a plurality of rows of dimples are formed along the tire circumferential direction.

7 Claims, 4 Drawing Sheets

(56) References Cited

OTHER PUBLICATIONS

Machine Translation: JP11-301214; Kobayashi, Takashi; No date.*
Machine Translation: JP07-076204; Gojo, A; No date.*
Machine Translation: JP59-076403U; Akinori Tokieda; No date.*
Machine Translation: JP2005-001593A; Gojo, A; (No date).*
Machine Translation: JP2009-090949; Tamura D; (No date).*
Japanese Office Action dated Mar. 26, 2014, issued in corresponding Japanese Patent Application No. 2010-253681, w/English translation (4 pages).
Japanese Notification of Reasons for Refusal dated Jan. 14, 2014, issued in corresponding Japanese application No. 2010-253681, w/ English translation (4 pages).

* cited by examiner

A-A CROSS SECTION          B-B CROSS SECTION

PNEUMATIC TIRE WITH TREAD HAVING NARROW GROOVE

BACKGROUND OF THE INVENTION

1. Field of the Invention

The present invention relates to a pneumatic tire which is provided with a shoulder land portion extending in a tire circumferential direction on a tread surface, and a narrow groove extending in the tire circumferential direction on the shoulder land portion.

2. Description of the Related Art

In a rotating pneumatic tire, a ground pressure generally tends to be higher in the vicinity of a around end of a shoulder land portion of a tread surface. As a result, there may arise a problem of irregular wear in which an amount of wear in the vicinity of the ground end of the shoulder land portion becomes larger in comparison with the other land portion of the tread surface. As a method of preventing the irregular wear mentioned above, there has been widely carried out a reduction of a rigidity of the shoulder land portion by forming a narrow groove extending in the tire circumferential direction in an inner side in a width direction than the ground end, in the vicinity of the ground end of the shoulder land portion of the tread surface.

Further, in a heavy duty pneumatic tire, particularly in a rib tire, there has been known the matter that a ground pressure is lowered by setting a narrow groove or a depression extending in a tire circumferential direction in a groove wall constructing a rib end portion for the purpose of preventing irregular wear of a rib end portion so as to suppress a rigidity of the rib end portion (refer, for example, to Japanese Unexamined Patent Publication No. H09-2018).

However, if the groove wall is provided with the narrow groove extending in the tire circumferential direction, a step caused by the narrow groove is generated on the tread surface in the process of wear and this is not preferable.

Further, in the Japanese Unexamined Patent Publication No. H09-2018, there is disclosed a pneumatic radial tire in which a plurality of concave portions having a depth in a transverse direction are formed in a groove depth direction, on a groove wall close to an inner side in the transverse direction of a main groove or an auxiliary groove, for the purpose of suppressing a rigidity of a land portion. However, a ground pressure becomes lower at a position where the concave portion exists in the groove wall, the ground pressure becomes higher at a position where the concave portion does not exist, and a ground pressure of a rib end portion becomes uneven in a circumferential direction, so that an irregular wear resistance is not sufficient.

SUMMARY OF THE INVENTION

The present invention is made by taking the actual condition mentioned above into consideration, and an object of the present invention is to provide a pneumatic tire which can suppress irregular wear generated in a shoulder land portion.

In order to solve the problem mentioned above, in accordance with the present invention, there is provided a pneumatic tire including a shoulder land portion extending in a tire circumferential direction on a tread surface, and a narrow groove extending in the tire circumferential direction on the shoulder land portion, in which dimples are arranged in a staggered manner with respect to the tire circumferential direction while overlapping with each other as seen in a depth direction of the narrow groove, on a groove wall in an inner side in a tire width direction of the narrow groove, andaplurality of rows of dimples are formed along the tire circumferential direction.

In the pneumatic tire in accordance with this structure, it is possible to relieve a ground pressure by setting a plurality of dimples in the groove wall in the inner side in the tire width direction of the narrow groove so as to lower a rigidity of the shoulder land portion. Accordingly, it is possible to promote a uniformizing of the ground pressure so as to suppress irregular wear generated in the shoulder land portion. Further, the dimples are arranged in such a manner that the plural rows of dimples are formed along the tire circumferential direction, however, are arranged in the staggered manner with respect to the tire circumferential direction while overlapping with each other as seen in the depth direction of the narrow groove. In accordance with this structure, the ground pressure becomes more uniform in the circumferential direction in comparison with the case that the dimples in each of the dimple rows are arranged linearly in the depth direction of the narrow groove, and it is possible to effectively suppress the irregular wear.

In the pneumatic tire in accordance with the present invention, it is preferable that the dimples in the adjacent dimple rows overlap with each other as seen in the tire circumferential direction. In accordance with this structure, since an appearance and a disappearance of the dimples do not occur alternately in the process of the wear, a change of a ground area of the shoulder land portion in the process of the wear becomes less.

In the pneumatic tire in accordance with the present invention, it is preferable that the dimple rows are equal to or more than three rows. It is possible to effectively lower the rigidity of the shoulder land portion by making the dimple rows equal to or more than three rows.

In the pneumatic tire in accordance with the present invention, it is preferable that the groove wall between the dimples is formed as a flat surface. If the groove wall between the dimples is formed as a convex shape, it is hard to discharge a stone that intrudes into the narrow groove since the convex shape holds the stone, and a so-called stone drilling in which a crack is formed in a groove bottom by the stone tends to be generated. In accordance with the present invention, since the groove wall between the dimples is formed as the flat surface, it is hard to hold the stone that intrudes into the narrow groove.

In the pneumatic tire in accordance with the present invention, it is preferable that an opening of the dimple is a rhomboid shape having round corners. By forming the opening of the dimple as the rhomboid shape, the dimples in the adjacent dimple rows can be easily overlapped with each other as seen in the depth direction of the narrow groove, at a time of arranging the dimples in the staggered manner. Further, the crack is hard to be generated beginning at the corners by rounding the corners of the opening.

DETAILED DESCRIPTION OF THE PREFERRED EMBODIMENTS

Figure 1:
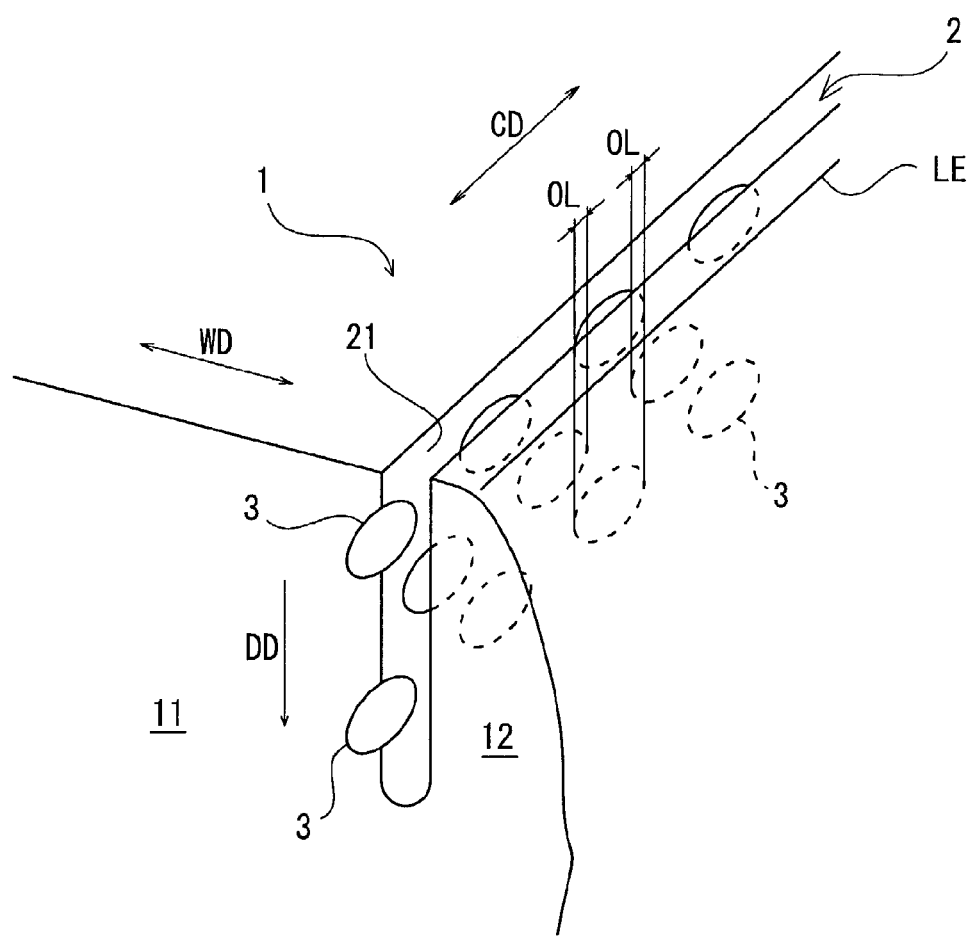
FIG. 1 is a perspective view showing a shoulder land portion of a pneumatic tire in accordance with the present invention.
Figure 2:
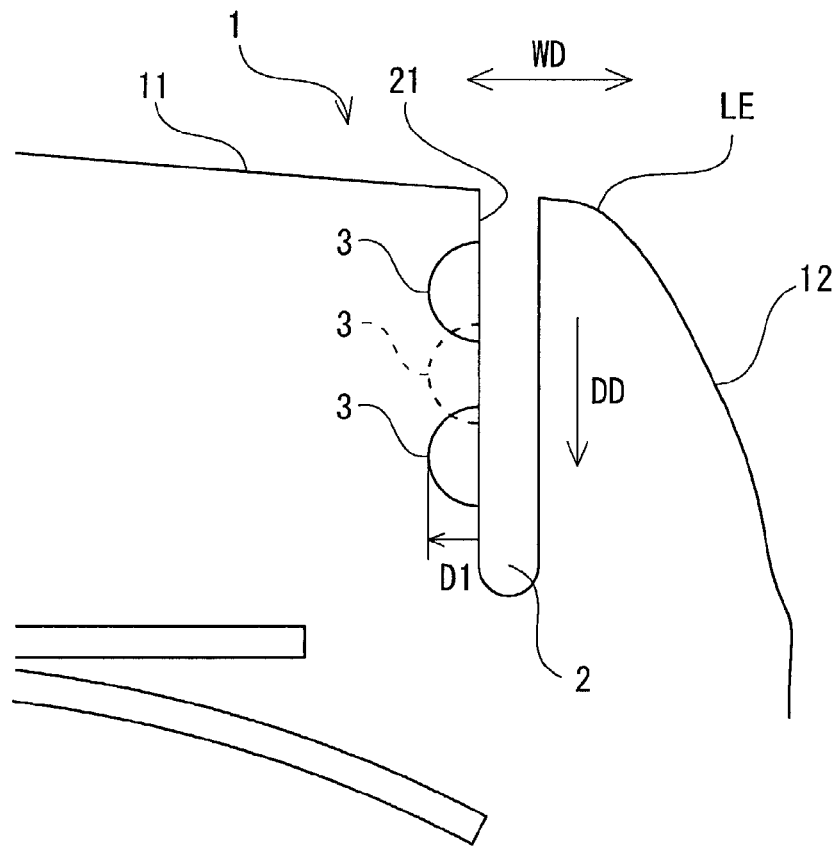
FIG. 2 is one example of a cross sectional view of a tire meridian direction in the shoulder land portion.
Figure 3:
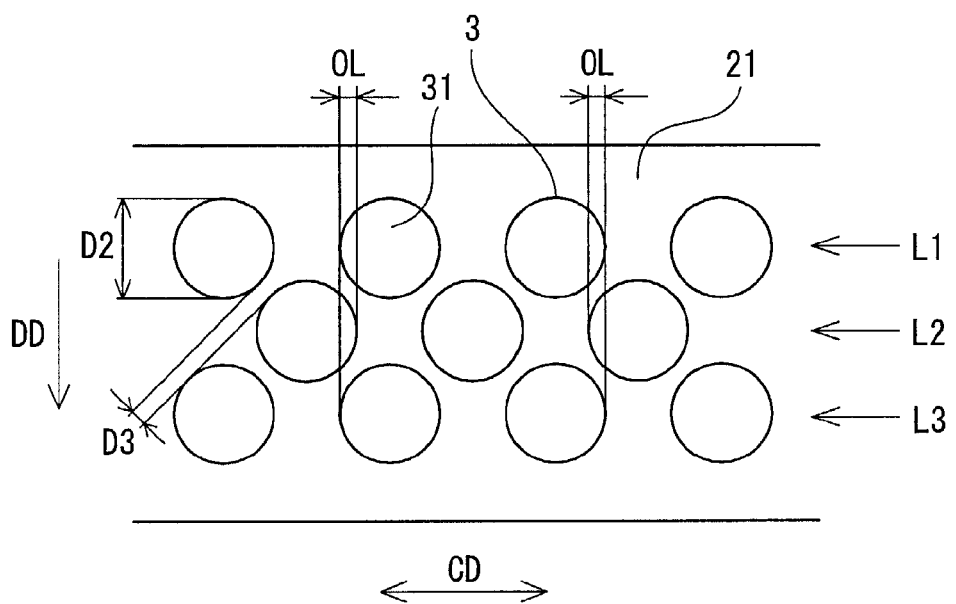
FIG. 3 is a front elevational view of a groove wall in an inner side in a tire width direction of a narrow groove.

A description will be given below of an embodiment in accordance with the present invention with reference to the accompanying drawings. FIG. 1 is a perspective view showing a shoulder land portion of a pneumatic tire in accordance with the present invention. FIG. 2 is one example of a cross sectional view of a tire meridian direction in the shoulder land portion. FIG. 3 is a view obtained by viewing a groove wall in an inner side in a tire width direction of a narrow groove from a front surface. In FIGS. 1 to 3, reference symbol WD denotes a tire width direction, and reference symbol CD denotes a tire circumferential direction.

The pneumatic tire in accordance with the present embodiment is provided with a shoulder land portion 1 extending in the tire circumferential direction CD on a tread surface. The shoulder land portion 1 is provided with a narrow groove 2 extending in the tire circumferential direction CD.

The shoulder land portion 1 is positioned in an outer side in the tire width direction WD than a main groove (not shown) extending in the tire circumferential direction CD in an outermost side in the tire width direction WD of the tread surface. In the present embodiment, there is shown an example in which the shoulder land portion 1 is constructed by a rib type. In this case, in the pneumatic tire in the present invention, a tread pattern can employ a rib type, a block type, a lug type or the like, without being limited particularly.

The narrow groove 2 in accordance with the present embodiment extends in the tire circumferential direction CD in an inner side in the tire width direction WD than a ground end LE of the shoulder land portion 1, and sectionalizes the shoulder land portion 1 into a main body land portion 11 in an inner side in the tire width direction WD and a sacrifice land portion 12 in an outer side in the tire width direction WD. It is preferable that the narrow groove 2 is provided in a region within 5% of a tread ground width based on the ground end LE for effectively lowering irregular wear of the pneumatic tire. A groove depth of the narrow groove 2 can be appropriately changed in accordance with a size of the pneumatic tire. For example, in 295/75R22.5 size, 10 to 20 mm is preferable for lowering the irregular wear, and 13 to 16 mm is more preferable. Further, in the present embodiment, the narrow groove 2 is set such that a groove width in the tire width direction WD becomes approximately constant from a tread surface toward a groove bottom. As the groove width of the narrow groove 2, for example, 0.5 to 3.0 mm is exemplified.

A plurality of dimples 3 are formed in a groove wall 21 in the inner side in the tire width direction WD of the narrow groove 2. The dimples 3 are arranged in a staggered manner with respect to the tire circumferential direction CD while overlapping with each other as seen in a depth direction DD of the narrow groove 2, as shown in FIG. 3, and a plurality of dimples rows are formed along the tire circumferential direction CD. In this case, there is shown an example in which the dimple rows are set to three rows L1, L2 and L3, however, the number of the dimple rows is not limited to this.

Further, it is preferable that the dimples 3 in the adjacent dimple rows (L1 and L2, and L2 and L3) are overlapped with each other as seen in the tire circumferential direction CD.

The dimples 3 are formed as a concave shape in the groove wall 21 of a flat surface. In other words, the groove wall 21 between the dimples 3 is formed as a flat surface.

The dimple 3 is formed as a spherical shape, and an opening 31 is formed as a circular shape. A cross sectional shape of the dimple 3 is formed as a circular arc shape as shown in FIG. 2 in the present embodiment, however, is not limited to the circular arc shape as long as no angular section is provided.

It is preferable that a depth D1 of the dimple 3 is between 2 and 4 mm. If the depth D1 is less than 2 mm, an effect of lowering the rigidity of the shoulder land portion 1 is small, and if the depth D1 exceeds 4 mm, the rigidity of the shoulder land portion 1 is lowered too much.

Further, it is preferable that a magnitude D2 in a depth direction DD of the dimple 3 is between 3 and 5 mm. If the magnitude D2 is less than 3 mm, the effect of lowering the rigidity of the shoulder land portion 1 is small, and if the magnitude D2 exceeds 5 mm, the rigidity of the shoulder land portion 1 is lowered too much.

It is preferable that a distance D3 of two dimples 3 is made equal to or more than 1 mm. If the distance D3 is less than 1 mm, the adjacent dimples 3 are connected by a crack or the like, and there is a risk that the rigidity of the shoulder land portion 1 is lowered too much.

It is preferable that an overlap OL of the dimples 3 at a time of viewing in the depth direction DD is between 0.5 and 1.0 mm. If the overlap OL is less than 0.5 mm, the rigidity tends to be uneven in the tire circumferential direction CD, and if the overlap OL exceeds 1.0 mm, the dimples 3 are arranged densely, and the rigidity of the shoulder landportion 1 is lowered too much.

Further, it is preferable that a distance from the dimple 3 and the groove bottom of the narrow groove 2 to the closest belt end is equal to or more than 10 mm. If the belt end comes too close to the dimple 3 and the groove bottom of the narrow groove 2, a crack tends to be generated from the belt end, however, if the distance is equal to or more than 10 mm, it is possible to suppress the generation of the crack.

The pneumatic tire in accordance with the present invention is the same as the normal pneumatic tire except the structure mentioned above of the narrow groove 2 and the dimple 3, and the material, the shape, the structure, the manufacturing method and the like which have been conventionally known can be employed in the present invention.

<Other Embodiment>

Figure 4A:
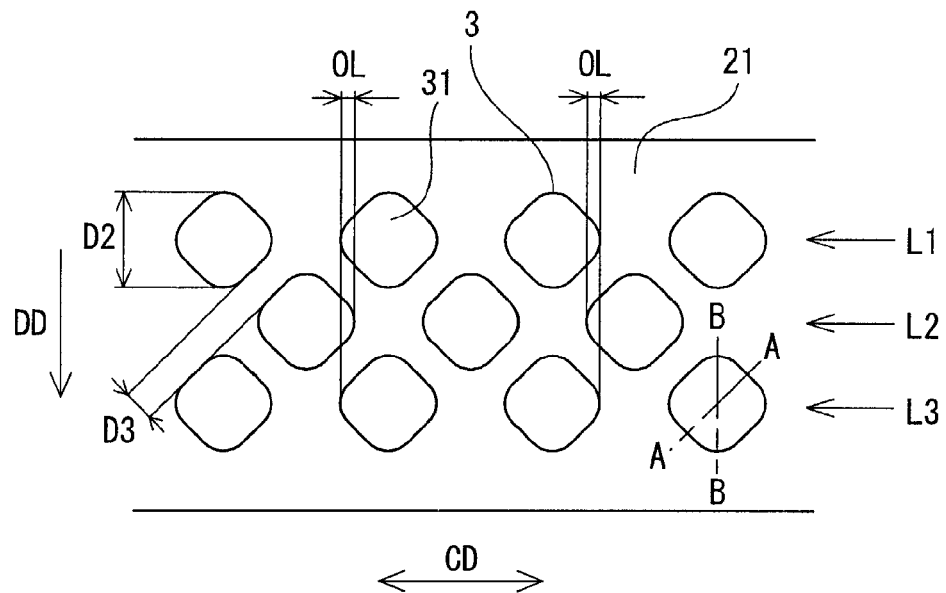
FIGS. 4A and 4B are a front elevational view and a cross sectional view of a dimple in accordance with the other embodiment.
Figure 4B:
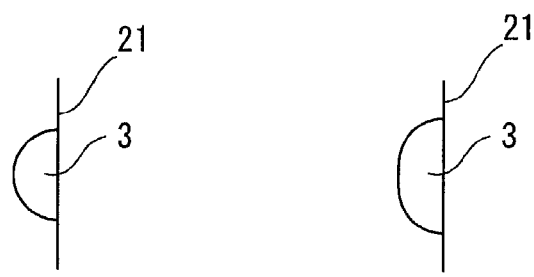

In the embodiment mentioned above, there is shown the example in which the dimple 3 is formed as the spherical shape, and the opening 31 is formed as the circular shape, however, they are not limited to them. For example, the opening 31 may be formed as an oval shape, a long hole shape or the like. Further, in the present invention, it is preferable that the opening 31 of the dimple 3 is formed as a rhomboid shape having rounded corners. FIGS. 4A and 4B show a dimple 3 in accordance with the other embodiment, in which FIG. 4A is a front elevational view and FIG. 4B is a cross sectional view along a line A-A and a line B-B of FIG. 4A. Even in this case, a cross sectional shape of the dimple 3 is formed as a circular arc shape as a whole or a circular arc shape at least corners.

EXAMPLE

A description will be given below of an example and the like which specifically show a structure and an effect of the present invention. In this case, items to be evaluated in the example were set as follows and a measurement was carried out.

(1) Irregular Wear Resistance

A test tire (295/75R22.5) was installed to a front wheel of a tractor head of a long distance transport track, a width of a stepped wear portion generated in a shoulder rib end after traveling on a dry road surface at 150,000 km was measured in a tire width direction, and an inverse number thereof was evaluated by an index number. In this case, the evaluation was shown by an index number evaluation at a time of setting a comparative example 1 to 100, and a greater numerical value indicates a good irregular wear resistance.

(2) Stone Drilling Resistance

A test tire (295/75R22.5) was installed to a front wheel of a tractor head of a long distance transport track, and whether or not a stone drilling was generated in a groove bottom of a narrow groove of a shoulder rib end after traveling on a dry road surface at 150,000 km was checked out.

Example 1

A pneumatic tire in which the dimple 3 shown in FIG. 3 was formed in the groove wall 21 of narrow groove 2 of the shoulder land portion 1 was manufactured. A groove depth of the narrow groove 2 was set to 15 mm, and a groove width of the narrow groove 2 was set to 2 mm. The overlap OL was set to 0.5 mm. A result obtained by carrying out the evaluation mentioned above by using the pneumatic tire is shown in Table 1.

Example 2

A pneumatic tire in which the dimple 3 shown in FIG. 4 was formed in the groove wall 21 of narrow groove 2 of the shoulder land portion 1 was manufactured. The overlap OL was set to 0.5 mm. The narrow groove 2 and the other shapes and the like were set to be the same as the example 1. A result obtained by carrying out the evaluation mentioned above by using the pneumatic tire is shown in Table 1.

Comparative Example 1

Figure 5A:
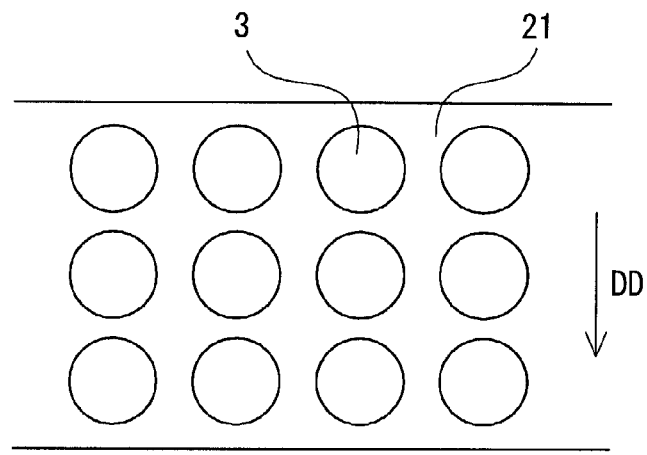
FIGS. 5A to 5C are front elevational views of groove walls of narrow grooves in accordance with comparative examples.

A pneumatic tire in which a dimple 3 shown in FIG. 5A was formed in the groove wall 21 of the narrow groove 2 of the shoulder land portion 1 was manufactured. In other words, the dimples 3 are arranged linearly (in series) in the depth direction DD of the narrow groove 2. The narrow groove 2 and the other shapes and the like were set to be the same as the example 1. A result obtained by carrying out the evaluation mentioned above by using the pneumatic tire is shown in Table 1.

Comparative Example 2

Figure 5B:
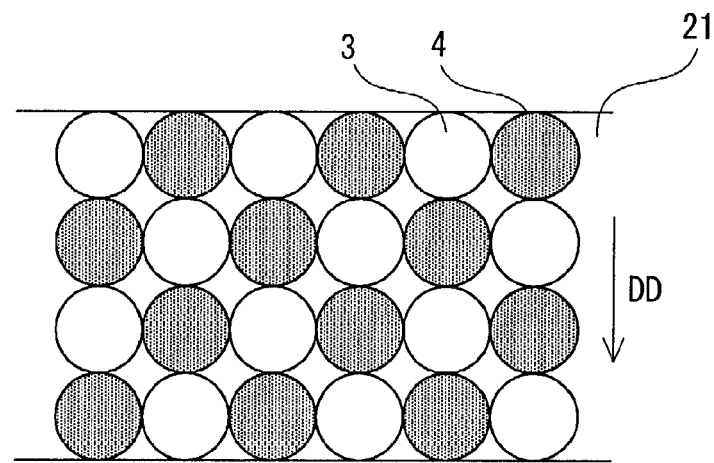

A pneumatic tire in which a dimple 3 and a convex portion 4 shown in FIG. 5B are formed in the groove wall 21 of the narrow groove 2 of the shoulder land portion 1 was manufactured. The convex portion 4 is formed as an approximately semispherical shape, and corresponds to a hatched portion in the drawing. In other words, the dimples 3 were arranged in a staggered manner, and the convex portion 4 was formed in a staggered manner between two adjacent dimples 3. Further, the dimples 3 do not overlap with each other. The narrow groove 2 and the other shapes and the like were set to be the same as the example 1. A result obtained by carrying out the evaluation mentioned above by using the pneumatic tire is shown in Table 1.

Comparative Example 3

Figure 5C:
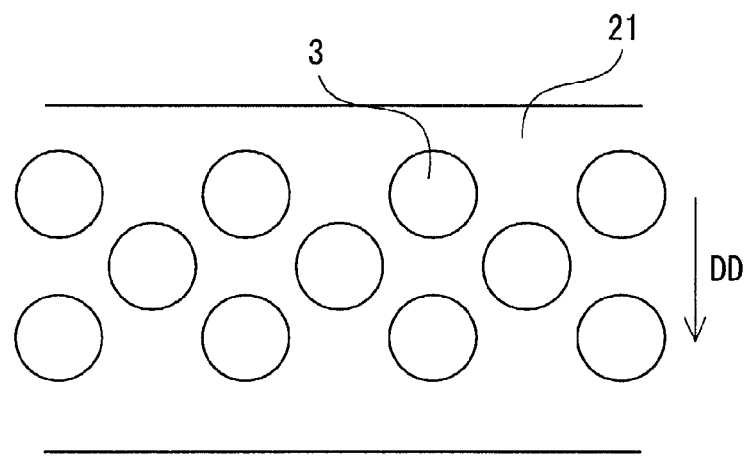

As shown in FIG. 5C, it was set to the same as the example 1, except the matter that the dimples 3 are not overlapped with each other as seen in the depth direction DD of the narrow groove 2. A result obtained by carrying out the evaluation mentioned above by using the pneumatic tire is shown in Table 1.

TABLE 1

|  | Comparative example 1 | Comparative example 2 | Comparative example 3 | Example 1 | Example 2 |
| --- | --- | --- | --- | --- | --- |
| arrangement of dimples | in series | staggered | staggered | staggered | staggered |
| overlap | — | none | none | 0.5 | 0.5 |
| convex portion | none | with | none | none | none |
| Irregular wear resistance | 100 | 110 | 110 | 125 | 130 |
| stone drilling | none | with | none | none | none |

As shown in Table 1, in the pneumatic tire in accordance with the examples 1 and 2, it is known that the irregular wear resistance is dramatically improved in comparison with the pneumatic tire in accordance with the comparative example 1. Further, the pneumatic tire in accordance with the example 2 is excellent in the irregular wear resistance in comparison with the pneumatic tire in accordance with the example 1. On the other hand, in the pneumatic tires in accordance with the comparative example 2 and the comparative example 3, it is known that the irregular wear resistance is somewhat improved in comparison with the pneumatic tire in accordance with the comparative example 1, however, the irregular wear resistance is inferior in comparison with the pneumatic tires in accordance with the examples 1 and 2. Further, in the comparative example 2, since the convex portion 4 exists in the groove wall 21 of the narrow groove 2, the stone drilling is generated.

DESCRIPTION OF REFERENCE NUMERALS

1 shoulder land portion
2 narrow groove
3 dimple
4 convex portion
11 main body land portion
12 sacrifice land portion
21 groove wall
31 opening
CD tire circumferential direction
WD tire width direction
DD depth direction of a narrow groove
OL overlap

What is claimed is:
1. A pneumatic tire comprising:
a shoulder land portion extending in a tire circumferential direction on a tread surface; and
a narrow groove extending in the tire circumferential direction on the shoulder land portion,
wherein dimples are arranged in a staggered manner with respect to the tire circumferential direction while overlapping with each other as seen in a depth direction of the narrow groove, and the dimples are arranged on only a groove wall in an inner side in a tire width direction of the narrow groove, and a plurality of rows of dimples are formed along the tire circumferential direction,
wherein the groove wall on an outer side in a tire width direction is a flat wall surface, and wherein the groove wall on the inner side in the tire width direction other than the dimples is a flat wall surface.

2. The pneumatic tire as claimed in claim 1, wherein the dimples in the adjacent dimple rows overlap with each other as seen in the tire circumferential direction.

3. The pneumatic tire as claimed in claim 1, wherein the dimple rows are equal to or more than three rows.

4. The pneumatic tire as claimed in claim 1, wherein the groove wall between the dimples is formed as a flat surface.

5. The pneumatic tire as claimed in claim 1, wherein an opening of the dimple is a rhomboid shape having round corners.

6. The pneumatic tire as claimed in claim 1, wherein the dimples in adjacent rows are staggered, and the dimples in adjacent rows overlap when viewed in the depth direction (DD) and when viewed in the circumferential direction (CD).

7. The pneumatic tire as claimed in claim 1, wherein a magnitude D2 in the depth direction (DD) of the dimple is 3 to 5 mm, and a distance D3 between two of the dimples is 1 mm or more.

\* \* \* \* \*